United States Patent [19]

Thomas

[11] 4,268,067
[45] May 19, 1981

[54] SEAT BELT TENSION ELIMINATOR

[75] Inventor: Rudy V. Thomas, Macomb, Mich.

[73] Assignee: Allied Chemical Corporation, Morris Township, Morris County, N.J.

[21] Appl. No.: 62,276

[22] Filed: Jul. 30, 1979

[51] Int. Cl.³ .............................................. B60R 21/10
[52] U.S. Cl. ................... 280/802; 24/31 V; 24/230 A; 297/469
[58] Field of Search ............... 280/802, 803, 804, 805, 280/806, 807, 808, 801; 297/468, 469, 475; 24/230 A, 230 R, 248 B, 31 V, DIG. 11

[56] References Cited

U.S. PATENT DOCUMENTS

| 2,916,786 | 12/1959 | Legat | 24/230 A |
| 3,328,081 | 6/1967 | Scruggs | 297/468 |
| 3,545,788 | 12/1970 | Brawner | 280/807 X |
| 3,584,896 | 6/1971 | Jantzen | 280/807 |
| 3,860,261 | 1/1975 | Takada | 297/475 |
| 3,957,222 | 5/1976 | Bladh | 242/107 |
| 4,004,583 | 1/1977 | Johnson | 128/134 |
| 4,099,684 | 7/1978 | Mori et al. | 242/107 |
| 4,101,091 | 7/1978 | Breitfeld | 242/107 |
| 4,175,773 | 11/1979 | Miller | 280/803 |

FOREIGN PATENT DOCUMENTS

| 2263291 | 12/1972 | Fed. Rep. of Germany | 280/803 |
| 7604742 | 11/1977 | Netherlands | 280/806 |

Primary Examiner—John A. Pekar
Attorney, Agent, or Firm—Roger H. Criss

[57] ABSTRACT

Seat belt tension eliminator device in a vehicle safety belt system, especially for a passive belt system, including fasteners, such as velveting fasteners, associated with the shoulder and lap belts and adapted to be engaged with each other when the belts are secured about an occupant, whereby the tension exerted by the shoulder belt is transferred to the lap belt.

15 Claims, 6 Drawing Figures

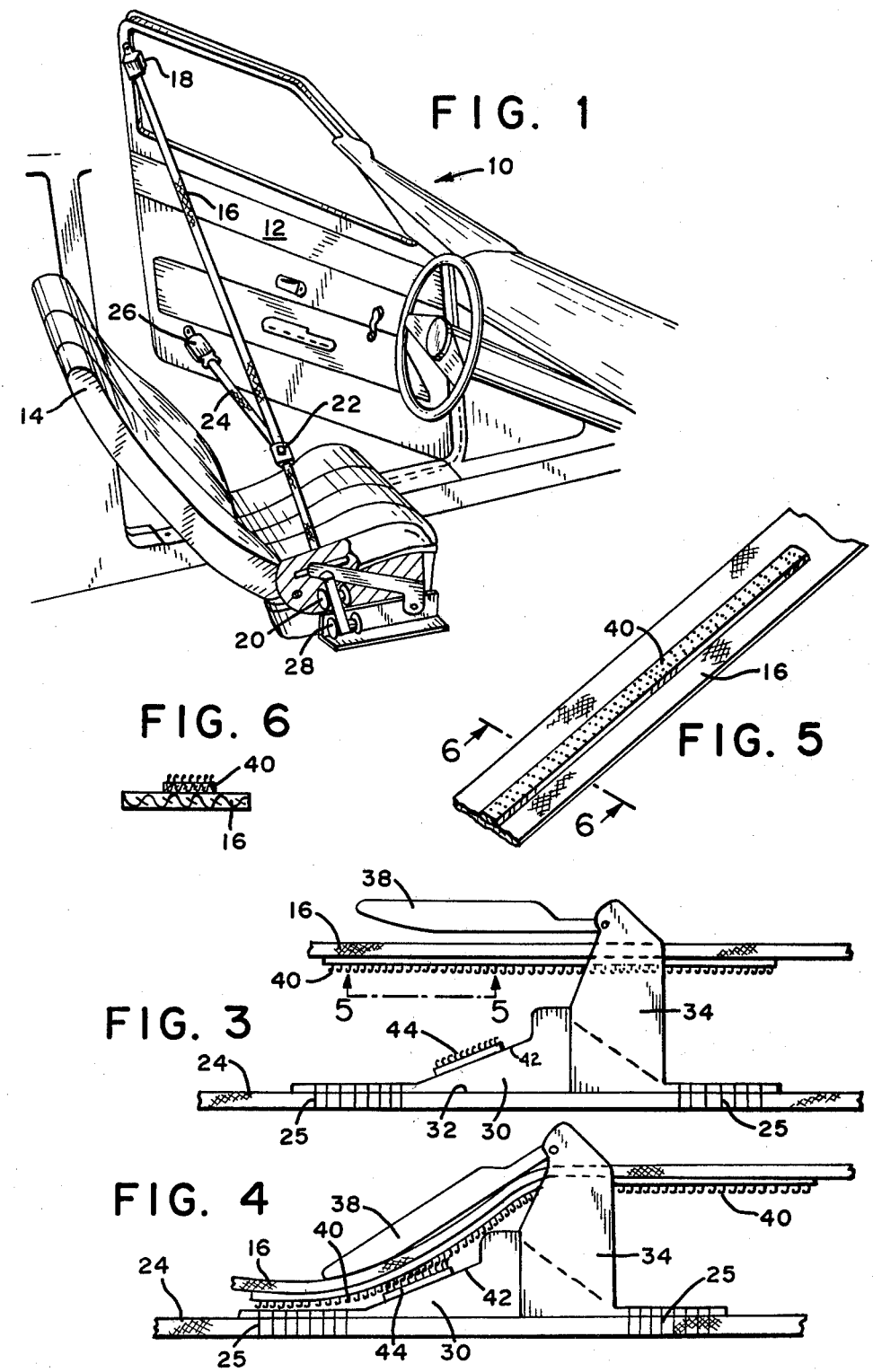

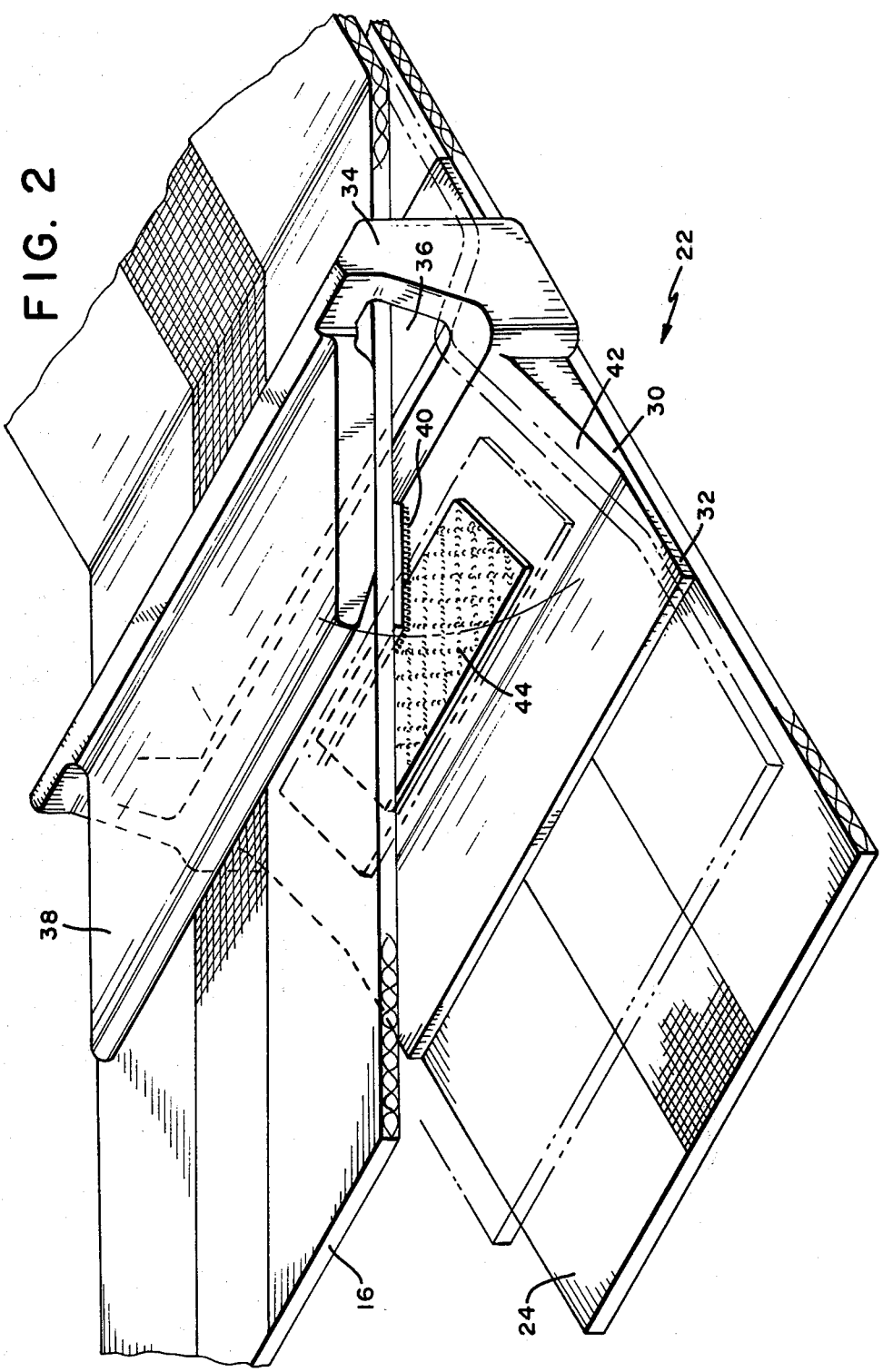

SEAT BELT TENSION ELIMINATOR

DESCRIPTIION

1. Background of the Invention

This invention relates to a tension eliminator for a vehicle safety belt system.

2. Description of the Prior Art

Various means have heretofore been suggested to eliminate or reduce the tension associated with the shoulder belt in a vehicle safety seat belt system. Such tension is caused by the force of the rewind spring of the shoulder belt retractor which tensions the shoulder belt towards the retractor, with the result that an uncomfortable pressure is often felt across the shoulder or chest of the wearer. The previously suggested devices to eliminate or reduce such tension usually include an elaborate mechanism provided on the retractor which either blocks out the rewind force of the rewind spring after the belt is placed about the occupant and the belt is extracted and retracted, or permits a rewind spring of a lesser force than the main rewind spring to take over the rewind action after such extraction and retraction. Such devices, however, are expensive and the occupant may not be aware that the comfort mechanism is actuated, with the result that an unsafe amount of slack is permitted to remain in the shoulder belt. It would be especially desirable to provide a simple tension elimination device in a passive seat belt system which automatically places the seat belt around the occupant.

It has been suggested in U.S. Pat. No. 3,957,222 to include a spring element in the belt itself and in U.S. Pat. No. 4,101,091 to provide different rigidities in the belt in order to reduce the shoulder belt tension. However, such suggestions would require a significant change in the seat belt manufacture and would not permit the occupant to choose whether the comfort mechanism should be actuated.

It would be desirable if a seat belt tension eliminator were provided which was easy to fabricate, inexpensive and could be manually actuated by the occupant as a result of a conscious effort on the part of the occupant.

SUMMARY OF THE INVENTION

In accordance with this invention, there is provided a vehicle safety belt system comprising:

(a) a lap belt and a shoulder belt adapted to be positioned about an occupant in a seat in the vehicle, the belts being connected to at least one seat belt retractor; and (b) means to eliminate undesirable tension exerted on the occupant by the shoulder belt due to the retraction force of the retractor, such means comprising (c) fastening means associated with each of the belts and extending at least partially within a region of each of the belts that is secured about the occupant, the fastening means being adapted for engagement with each other when the belts are secured about the occupant, whereby the tension exerted by the shoulder belt is transferred to the lap belt.

Preferably, the fastening means is in the form of a velveting fastener which is attached to the shoulder belt and either directly or indirectly attached to the lap belt. Since the fastener need only be provided in the area of the belts which extend about the occupant, there is no interference with the retracting mechanism. The present system is especially useful in a passive seat belt system which includes separate retractors for the shoulder and lap belts. When actuated, the tension of the shoulder belt is transferred to the lap belt retractor, which most occupants do not find uncomfortable.

The present invention thus provides a relatively inexpensive device which can be easily fabricated and placed on the webbing and the occupant knows when the tension eliminator is actuated so that a proper amount of slack may be placed into the shoulder belt.

BRIEF DESCRIPTION OF THE DRAWINGS

FIG. 1 is a view of the seat belt system of this invention.

FIG. 2 is an isometric view of a junction means of the seat belt system which incorporates the fastening means, with the engaged position indicated by dotted lines.

FIG. 3 is a side view of the junction means of FIG. 2 in the nonengaged position.

FIG. 4 is a side view similar to FIG. 3, but in the engaged position.

FIG. 5 is a view of a portion of the shoulder belt of FIG 3, taken along the line 5—5 of FIG. 3.

FIG. 6 is a cross-sectional view along line 6—6 of FIG 3.

DESCRIPTION OF THE PREFERRED EMBODIMENTS

With reference to FIG. 1, there is shown a seat belt system, generally indicated at 10, in a vehicle which includes a door 12 and a seat 14. A shoulder belt 16 has one end mounted to door 12 through an anchor 18 and its other end connected to a retractor 20 located on the inboard side of seat 14. Shoulder belt 14 extends through an intermediate portion thereof through a guide clip 22 as described in detail below. A separate lap belt 24 has one end mounted to door 12 through anchor 26 and its other end connected to a retractor 28 also located on the inboard side of seat 14. Retractors 20 and 28 are of the emergency locking type and may be housed in a single frame attached to the vehicle door or console adjacent seat 14 inboard of door 12. Preferably, anchors 18 and 26 are in the form of seat belt buckle and tongue assemblies which may be utilized for emergency release of the passive seat belt system shown in FIG. 1. Alternatively, retractors 20 and 28 may be provided with a release mechanism to permit free spooling and thereby provide an emergency release from the system. Although the system shown in FIG. 1 is a passive seat belt system, the present invention may also be utilized with a conventional active seat belt system, with anchors 18 and 26 located in a position remote from door 12. Also, a single belt anchor may be utilized.

A junction means in the form of a guide clip 22 is secured to lap belt 24 intermediate the ends of lap belt 24. As shown in FIGS. 2-4, junction means 22 is fixed to lap belt 24 by stitching 25 or by adhesive, plastic anchors or the like so that guide clip 22 moves along with lap 24 as the latter is extracted and retracted from retractor 28. Preferably, the surface of lap belt 24 facing the occupant is relatively smooth at the area adjacent to stitching 25 so as not to become snagged on the occupant's clothing.

Guide clip 22 is in the general shape of an angle and includes a lower portion 30 having a planar surface 32 overlying lap belt 24. Preferably, planar surface 32 is coextensive with the width of belt 24. Extending generally normal to portion 30 is an upper portion 34 which includes a slot 36 through which shoulder belt 16 freely moves. Slot 36 is slightly wider than shoulder belt 16 and is spaced from lap belt 24 such that the belts are separated from one another. Since shoulder belt 16 is free to move through guide clip 22, which is preferably formed from a plastic material, the belts are free to independently be positioned about an occupant in seat 14 and can thereby adjust to different size occupants and seat positions.

Lever 38 is pivotally mounted on upper portion 34 of guide clip 22 above the position of shoulder belt 16. Lever 38, which also may be made of plastic, is pivotable in a downwards, counter-clockwise direction to engage shoulder belt 16 and move it into contact with lap belt 24 to eliminate tension as described below. Lever 38 may be provided with a spring which biases it to its nonengaged position so that the lever returns to such position after manual actuation by the occupant.

In accordance with this invention, attached on the lower side of shoulder belt 16 partially along the length of the belt which surrounds the occupant when the belt is in place is a male half 40 of a velveting fastener, and attached to guide clip 22 along an inclined surface 42 is the female half 44 of a velveting fastener. Such velveting fasteners are known as Velcro fasteners. As is known, the male half 40 comprises a series of hooks formed of filamentary material (such as nylon) and the female half 44 is formed from a number of loops of filamentary material. Either or both of the velveting strips may be flexible. The velveting fasteners are adapted to be easily hooked together by pressing the male and female halves together and are easily separated by pulling the halves apart.

The male half 40 of the velveting fastener is preferably sewn to shoulder harness 16 via stitching 46, but may be secured by adhesive or other suitable means. Preferably, the female half 44 of the velveting fastener is attached by adhesive to the plastic guide clip 22 and may extend onto the upper surface of lap belt 24. Other securing means may alternatively be employed. Reference is made to U.S. Pat. Nos. 4,099,684 and 4,004,583 to the use of Velcro fasteners in conjunction with seat belts.

In operation, when door 12 is closed shoulder belt 16 and lap belt 24 are rewound by their respective retractors 20 and 28. Guide clip 22 moves with lap belt 24 towards the inboard side of seat 14 and shoulder belt 16 moves through slot 36 towards retractor 20. When the belts are secured about the occupant, clip 22 preferably is located adjacent the inboard hip of the occupant, such as between the occupant and the edge of the seat. In order to actuate the tension elimination mechanism, the occupant extracts shoulder harness 16 from its retractor to provide sufficient slack in the belt, and then depresses lever 38 which moves shoulder harness 16 towards lap belt 24 and specifically towards the inclined surface 42 of guide clip 22, until male half 40 contacts female half 44 of the velveting fastener whereupon the shoulder belt and lap belt are effectively fastened together. As a result, the rewind force of the retraction spring of retractor 20 is prevented from acting on the shoulder belt 16 and only the rewind force of the rewind spring associated with retractor 28 is actuable to rewind the belt. Thus, the tension associated with the shoulder belt retractor is eliminated and transferred to the lap belt retractor. With the tension eliminator in place, when door 12 is opened the movement of shoulder belt 16 and lap belt 24 outwards from their respective retractors causes separation of the male and female halves of the velveting fastener. However, forward movement of the occupant such as incident to adjusting contols on the dashboard moves both belts together out of their retractors, without separation of the belts. A subsequent reclining motion causes the excess webbing to be rewound on the retractors, thereby providing a memory in the system.

Although in the above description the velveting fastener associated with lap belt 24 has been described as being attached to guide clip 22, it will be appreciated that a guide clip is not necessary in the present invention. Rather, the Velcro fastening may be attached directly to lap belt 24 as well, and the tension elimination achieved merely by moving the shoulder and lap belts together. It should be also understood that the male half of the velveting fastener may be on the lap belt rather than on the shoulder belt, with the female half on the shoulder belt. In addition, although in the foregoing description reference has been made to the use of two retractors, it will be appreciated that the present invention is useful with a single retractor as well.

If desired, the male half of the velveting fastener may be located only for a predetermined length on shoulder harness 16 so that if too much webbing were extended from retractor 20, there would be no male half of the fastener on such webbing, thereby preventing the tension eliminator from being employed.

The guide clip of the present invention may be that which is disclosed in cofiled patent application Ser. No. 62,082, filed July 30, 1979.

Although in the foregoing description it has been indicated that the fastening means is associated with both belts, it is also possible to provide fastening means only on the shoulder harness and locate a complimentary fastening means on the vehicle structure, such as the B-pillar, D-ring, door or seat.

It is to be understood that variations and modifications of the present invention may be made without departing from the scope thereof. It is also to be understood that the specific invention is not to be limited by the specific embodiments disclosed herein but only in accordance with the appended claims when read in light of the foregoing specification.

I claim:

1. A vehicle safety belt system comprising:
 (a) a lap belt and a separate shoulder belt adapted to be positioned about an occupant in a seat in said vehicle, said belts being connected to at least one seat belt retractor; and
 (b) means to eliminate undesirable tension exerted on said occupant by said shoulder belt due to the retraction force of said retractor, said means comprising
 (c) fastening means associated with each of said belts and extending at least partially within a region of each of said belts that is secured about said occupant, said fastening means being adapted for engagement with each other when said belts are secured about said occupant, whereby the tension exerted by said shoulder belt is transferred to said lap belt.

2. The seat belt system of claim 1 wherein said fastening means are adapted for engagement with each other by manual movement of one belt towards said other belt.

3. The seat belt system of claim 1 wherein said fastening means comprises a velveting fastener.

4. The seat belt system of claim 1 including separate retractors for said shoulder and lap belts.

5. The safety belt system of claim 1 wherein the fastening means of one of said belts is secured to said belt, and wherein spacing means is secured to said other of said belts, the fastening means associated with said other belt being secured to said spacing means.

6. The safety belt system of claim 5 wherein said spacing means is secured to said lap belt.

7. The safety belt system of claim 6 wherein said spacing means includes a first means secured to said lap belt and a second means spaced from said first means and communicating with said shoulder belt to permit said shoulder belt to move with respect to said spacing means.

8. The safety belt system of claim 7 wherein said spacing means comprises means for displacing said shoulder belt towards said lap belt.

9. The safety belt system of claim 8 wherein said first means of said spacing means comprises a generally planar section extending over said lap belt, said second means comprises a slot formed in the leg extending from said planar section and said displacing means comprises a lever pivotably mounted on said leg.

10. The safety belt system of claim 9 including separate retractors for said shoulder and lap belts.

11. The safety belt system of claim 10 wherein said system is adapted to automatically secure said occupant in said seat, said retractors being positioned on the interior side of said seat, and said lap and shoulder belts being connected to a door in said vehicle adjacent to said seat.

12. The safety belt system of claim 11 wherein said fastening means comprises velveting fasteners and said velveting means are adapted to be automatically separated when said door is opened.

13. The safety belt system of claim 1 wherein said fastening means comprises a flexible element.

14. A junction device adapted for use in a vehicle safety belt system including lap and shoulder belts, said junction device comprising a generally planar section adapted to be secured to said lap belt, a leg extending from said generally planar section, slot means formed in said leg and adapted for communication with said shoulder belt, a pivotable lever mounted on said leg adjacent said slot and adapted to move said shoulder belt towards said generally planar section, and a velveting fastener secured to said generally planar section.

15. The junction device of claim 14 including an inclined surface on said generally planar section, said inclined surface facing said shoulder belt, and wherein said velveting fastener is secured to said inclined surface.

* * * * *